US008519974B2

(12) United States Patent
Berggren

(10) Patent No.: US 8,519,974 B2
(45) Date of Patent: Aug. 27, 2013

(54) TOUCH SENSING DEVICE, TOUCH SCREEN DEVICE COMPRISING THE TOUCH SENSING DEVICE, MOBILE DEVICE, METHOD FOR SENSING A TOUCH AND METHOD FOR MANUFACTURING A TOUCH SENSING DEVICE

(75) Inventor: Lars Berggren, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 764 days.

(21) Appl. No.: 12/689,341

(22) Filed: Jan. 19, 2010

(65) Prior Publication Data
US 2011/0175844 A1 Jul. 21, 2011

(51) Int. Cl.
*G06F 3/045* (2006.01)

(52) U.S. Cl.
USPC .......................................... 345/174; 345/173

(58) Field of Classification Search
USPC ............................... 345/156, 173, 174
See application file for complete search history.

(56) References Cited

U.S. PATENT DOCUMENTS
2009/0273573 A1 11/2009 Hotelling

FOREIGN PATENT DOCUMENTS
| EP | 2 026 178 A1 | 2/2009 |
| WO | 03088135 A2 | 10/2003 |
| WO | 2008009687 A2 | 1/2008 |

OTHER PUBLICATIONS

International Preliminary Report on Patentability with Written Opinion of the International Searching Authority, corresponding to PCT/EP20101007330, mailed on Aug. 2, 2012.
Analog Devices, Captouch TM Programmable Controller for Single Electrode Capacitance Sensors, AD7147, Preliminary Technical Data, 06/07—Preliminary Version F, 2007 published by Analog Devices, Inc.
International Search Report, corresponding to PCT/EP2010/007330, mailed Mar. 17, 2011.
Written Opinion of the International Searching Authority, corresponding to PCT/EP2010/007330, mailed Mar. 17, 2011.

*Primary Examiner* — Ricardo L Osorio
(74) *Attorney, Agent, or Firm* — Renner, Otto, Boisselle & Sklar LLP

(57) ABSTRACT

The present invention relates to a touch sensing device, touch screen device comprising a touch sensing device, mobile device, method for sensing a touch and method for manufacturing a touch sensing device allowing various kinds of input operations. The touch sensing device comprises a deformable cover layer; a plurality of capacitive touch sensitive electrode elements arranged in an electrode element layer; and a plurality of pressure sensitive elements each being spatially separated from each other and being coupled to an associated capacitive touch sensitive electrode element of said electrode element layer. One of said plurality of pressure sensitive elements and the associated capacitive touch sensitive electrode element are arranged so that when a current to or from said capacitive touch sensitive electrode element passes through said pressure sensitive element, the voltage across said pressure sensitive element changes in response to a pressure exerted upon said cover layer above said capacitive touch sensitive electrode element.

13 Claims, 5 Drawing Sheets

TOUCH SENSING DEVICE, TOUCH SCREEN DEVICE COMPRISING THE TOUCH SENSING DEVICE, MOBILE DEVICE, METHOD FOR SENSING A TOUCH AND METHOD FOR MANUFACTURING A TOUCH SENSING DEVICE

FIELD OF THE INVENTION

The present invention relates to a touch sensing device, touch screen device comprising a touch sensing device, mobile device, method for sensing a touch and method for manufacturing a touch sensing device. In particular, the touch sensing device may be used as user interface for controlling various functions in different devices, such as mobile devices.

BACKGROUND

Different kinds of sensors serving as user interfaces in devices, such as mobile devices, are known in the art for sensing an input action of a user. In touch sensors, the input is performed via touching a sensor surface with a finger or stylus. Therefore, touch sensors provide a user interface or man-machine interface to control various functions of the device having the touch sensor incorporated therein.

Known touch sensors work by reacting to a change in capacitance affected by the presence of a finger or a stylus of a user. The position sensing capability can be achieved by providing two layers with capacitive components in the touch sensor. These components are connected with each other horizontally in the first layer and vertically in the second layer to provide a matrix structure enabling to sense a position in x,y-coordinates of where the touch sensor is touched. In capacitive touch panels, a capacitive component of one layer forms one electrode of a capacitor and the finger or stylus forms another electrode.

In other touch sensors having a capacitive ITO pattern each sensor element consists of two electrodes. One connected to the controller and one connected to ground. When a finger is present the coupling is effected between ground electrode and top electrode and thus effecting the voltage.

For example, the so-called CapTouch Programmable Controller for Single Electrode Capacitance Sensors AD7147 manufactured by Analog Devices, Norwood, Mass., USA (see data sheet CapTouch™ *Programmable Controller for Single Electrode Capacitance Sensors, AD*7147, Preliminary Technical Data, 06/07—Preliminary Version F, 2007 published by Analog Devices, Inc) may be used to measure capacitance.

Recent applications, such as multi-touch applications, require that more than one position on a touch sensor is touched and sensed, e.g. to determine a section of an image on a display that is to be magnified or to trigger a specific function.

Since touch sensors are usually placed on top of a liquid crystal display (LCD), large parts of the sensor have to be made transparent, which can be achieved by manufacturing the touch sensor of transparent capacitive components.

Therefore, it is desirable to provide a touch sensing device, touch screen device, mobile device, method for sensing a touch and method for manufacturing a touch sensing device allowing various kinds of input operations.

DISCLOSURE OF INVENTION

A novel touch sensing device, touch screen device, mobile device, method for sensing a touch and method for manufacturing a touch sensing device are presented in the independent claims. Advantageous embodiments are defined in the dependent claims.

An embodiment of the invention provides a touch sensing device comprising a deformable cover layer, a plurality of capacitive touch-sensitive electrode elements arranged in an electrode element layer below the cover layer and a plurality of pressure-sensitive elements each being spatially separated from each other. Each of the plurality of pressure-sensitive elements is coupled to an associated capacitive touch-sensitive electrode element of the electrode element layer. At least one of the pressure-sensitive elements and the associated capacitive touch-sensitive electrode element are arranged so that when a current to or from the associated capacitive touch-sensitive electrode element passes through said one pressure-sensitive element, the voltage across the one pressure-sensitive element changes in response to a pressure exerted upon the cover layer above the associated capacitive touch-sensitive electrode.

Accordingly, by providing a pressure-sensitive element to a capacitive touch-sensitive electrode element, it is not only possible to sense whether the cover layer is touched, but also the pressure on the pressure-sensitive element resulting from the force of the touch can be estimated based on the voltage across the pressure-sensitive element. Therefore, different voltage changes measured across pressure-sensitive elements may serve as input operations, e.g. for a user interface, to trigger a certain function of a device being connected to or comprising the touch sensing device. Furthermore, using several pressure-sensitive elements with several associated capacitive touch-sensitive electrode elements, multi-touch operations can be realized.

In one embodiment, each pressure-sensitive element is comprised in a pressure concentration structure spatially separated from another pressure concentration structure. For example, the pressure concentration structure is formed in a columnar shape below the cover layer. Accordingly, a force applied to a section of the cover layer can be channelled and maintained at this section so that a detected pressure is largely confined to the touched section.

The pressure-sensitive element comprises preferably a material such as a quantum tunnelling composite (QTC) or is based on doped polymers. Accordingly, highly transparent pressure-sensitive elements can be realized.

In one embodiment, the touch sensing device further comprise a determination section to determine a change in resistivity of the pressure-sensitive element in response to the pressure exerted upon the cover layer. Accordingly, different input operations, such as different touches with different strengths on the cover layer, can be determined and a corresponding signal from the determination section may be forwarded to a controller to trigger a specific function.

For example, the determination section is adapted to determine the voltage across the pressure-sensitive element, which is, at least in a linear operation range, largely proportional to the resistivity.

In one embodiment, the determination section comprises a first and a second sample and hold circuit. Accordingly, a first voltage value can be sampled with the first sample and hold circuit and a second voltage value can be sampled with the second sample and hold circuit, wherein one sample value is preferably affected by a change in resistivity of the pressure-sensitive element when connected in series with the same so that a change in resistivity can be easily determined.

In one embodiment the touch sensing device further comprises a power supply coupled to at least one of the pressure-sensitive elements to supply a current to the associated capacitive touch-sensitive electrode element. Accordingly, it can be ensured that a current through the pressure-sensitive element, either from the power supply to the associated capacitive touch-sensitive electrode element or from the charged associated capacitive touch-sensitive electrode element to a determination section.

In one embodiment, the touch sensing device further comprises a controller to control supply of current to the capacitive touch-sensitive electrode element. Accordingly, the direction of the current flow in the touch sensing device can be controlled and a change in voltage across the pressure-sensitive element due to a resistivity change can be determined.

According to another embodiment, a touch screen device is provided comprising the touch sensing device described above and a display assembly place below the touch sensing device. Accordingly, a user may be prompted by a message or other information displayed on the display assembly to touch a specific section of the cover layer, i.e. apply a certain force so as to enable an input operation in z-direction. For example, the volume of a device, such as a music player, may be increased based on the strength of the force in z-direction.

According to another embodiment, a mobile device is provided comprising one of the above-described touch sensing devices or touch screen device. Accordingly, a mobile device may be provided with a novel type of user interface, wherein an input operation is dependent on a force or certain magnitude of the force applied to the cover layer.

Another embodiment of the invention provides a method for sensing a touch on a touch sensing device having a plurality of capacitive touch-sensitive electrode elements and associated pressure-sensitive elements, such as one of the above-described touch sensing devices. The method comprises the steps of passing through a pressure-sensitive element of the associated pressure-sensitive elements a current supplied to or from a capacitive touch-sensitive electrode element, and determining a voltage change across the pressure-sensitive element in response to a pressure exerted upon the touch sensing device. Accordingly, an input operation in z-direction can be realized based on a force on a cover layer. Therefore, different voltage changes measured across pressure-sensitive elements may serve as input operations, e.g. for a user interface, to trigger a certain function of a device being connected to or comprising the touch sensing device.

Another embodiment of the invention provides a method for manufacturing a touch sensing device. The method comprises the steps of providing a deformable cover layer and providing an electrode element layer of a plurality of individual capacitive touch-sensitive electrode elements below the cover layer. The method further comprises the steps of arranging below the electrode element layer a plurality of pressure-sensitive elements so as to be spatially separated from each other, and coupling to at least one pressure-sensitive element an associated capacitive touch sensitive electrode element of the electrode element layer, wherein the at least one pressure-sensitive element and the associated capacitive touch-sensitive electrode element are arranged and coupled so that when a current to or from the capacitive touch-sensitive electrode element passes through the pressure-sensitive element, the voltage across the pressure-sensitive element changes in response to a pressure exerted upon the cover layer above the capacitive touch-sensitive electrode. Accordingly, the above-described touch sensing device can be manufactured which has the above-described advantages.

BRIEF DESCRIPTION OF THE DRAWINGS

Embodiments of the invention will be described with respect to the following appended figures.

DESCRIPTION OF THE EMBODIMENTS

The further embodiments of the invention are described with reference to the figures. It is noted that the following description contains examples only and should not be construed as limiting the invention.

In the following, similar or same reference signs indicate similar or same elements.

Figure 1:
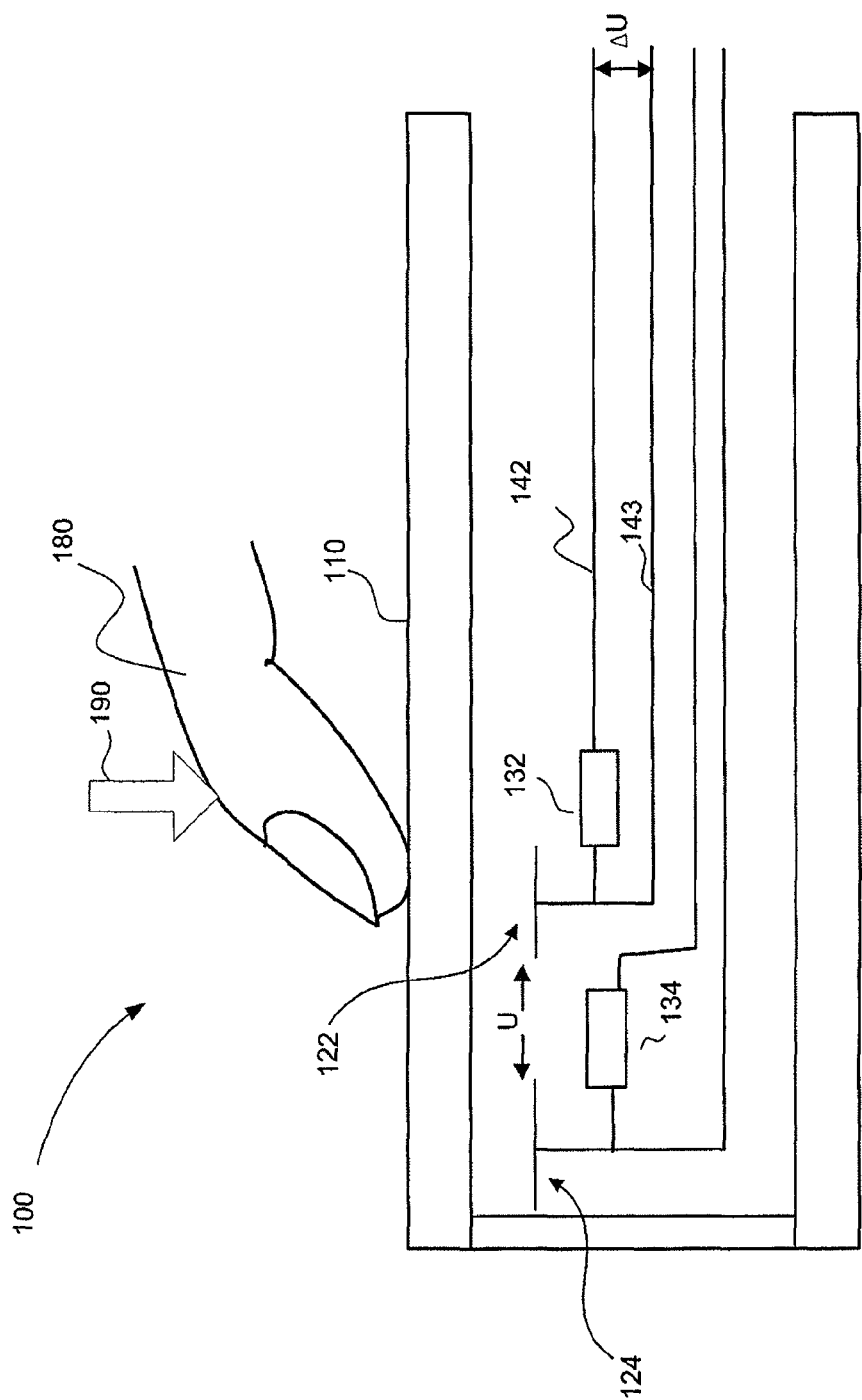
FIG. 1 illustrates a touch sensing device and elements thereof according to an embodiment of the invention.

FIG. 1 illustrates elements of a touch sensing device 100 according to an embodiment of the invention. In detail, the touch sensing device 100 comprises a cover layer 110, a first capacitive electrode element which is touch-sensitive 122, a second capacitive electrode element 124 which is touch-sensitive, a first pressure-sensitive element 132 and a second pressure-sensitive element 134. In the following, the capacitive touch-sensitive electrode elements will be simply called electrode elements. These electrode elements 122 and 124 are arranged in an electrode element layer below the cover layer 110 in FIG. 1.

As known in the art, an electrode element which can be coated underneath the cover layer and is preferably a transparent conductor made of indium tin oxide (ITO), for example, forms a part of a capacitor. Charge is supplied to the electrode element layer resulting in an electrostatic field, wherein the electrical properties are changed when a human finger, e.g. finger 180, or a stylus form a second conductive electrode as a counterpart to form the capacitor. Accordingly, a change in capacitance, i.e. in the electrostatic field, can be measured so that the finger 180 above the electrode element 122 on the cover layer 110 can be detected.

In FIG. 1, the first electrode element 122 is coupled to the first pressure-sensitive element 132 which is place in close proximity of the first electrode element. Further, the second electrode element 124 is coupled to the second pressure-sensitive element 134 so that both pressure-sensitive elements 132 and 134 are coupled to an associated capacitive touch-sensitive electrode element of the electrode element layer.

As can be seen in FIG. 1, the first and second pressure-sensitive elements are spatially separated in a direction substantially parallel to the surface of the cover layer 110. The cover layer 110 is deformable, i.e. not totally stiff, so that its shape is changeable. Preferably, the cover layer 110 is elastic so that once deformed, it eventually returns to its original shape. Further, the cover layer 110 is preferably at least partly made of a transparent material thus constituting a display window for the touch sensing device, which is particularly desirable when the touch sensing device is combined with a display assembly, such as an LCD, to form a touch screen device, which will be described in more detail below with respect to FIG. 3.

As illustrated in FIG. 1, a finger 180, which may form a second electrode of a capacitor, as described above, may further apply a force 190 to the cover layer 110. Due to the deformability of the cover layer 110 a force applied to a small section of the cover layer 110 leads to a deformation of the cover layer 110, in particular around this section, and a pressure is exerted upon the cover layer and on the elements underneath the depressed section of the cover layer 110.

In FIG. 1, since the first pressure-sensitive element 132 and its associated electrode element 122 are spatially separated from the second pressure-sensitive element 134 and its associated electrode 124, preferably mechanically separated by the structure of the materials underneath the cover layer 110, a stronger pressure is exerted on the first pressure-sensitive element 132 than on the second pressure-sensitive element 134 when the finger 180 deforms the cover layer 110. The pressure change caused by the force 190 applied by the finger 180 on the cover layer 110 can be detected by the pressure-sensitive element 132 as follows.

For example, pressure-sensitive element 132 is a pressure-sensitive element that changes its resistivity with pressure, i.e. a current flowing through the pressure-sensitive element will lead to different voltages across the pressure-sensitive element depending on the pressure applied thereon.

In detail, in FIG. 1, the first pressure-sensitive element 132 and the associated electrode element 122 are arranged so that when a current to or from the first electrode element 122 passes through the pressure-sensitive element 132, the voltage across the pressure-sensitive element 132 changes in response to the pressure exerted upon a section of the cover layer above the electrode element.

In other words, the first pressure-sensitive element and the first electrode element are placed in close proximity so that a touch by a finger or a stylus affects not only the electrode element underneath the finger, e.g. by a capacitance change, but also affects the resistivity of the pressure-sensitive element next to the electrode element. Accordingly, the electrode element 122 can detect the presence of the finger 180, i.e. the position on the cover layer 110 of the finger 180, and the pressure-sensitive element 132 can detect the force applied by the finger 180.

The second electrode element 124 and the second pressure-sensitive element 134 may be similarly arranged so that also the second pressure-sensitive element can be used for detection of a pressure change, for example when a current to or from the second electrode element 124 passes through the second pressure-sensitive element 134 and a voltage across the pressure-sensitive element 134 changes in response to a pressure exerted upon the cover layer above the electrode element 134.

In FIG. 1, the effect on the second pressure-sensitive element 134 of the force applied by the finger 180 is dependent on the structure and mechanical properties of the cover layer 110 and the material below the cover layer 110, in which elements 122, 132, 124 and 134 are embedded in. However, due to the deformability of the cover layer 110 and spatial and mechanical separation of the pressure-sensitive elements 132 and 134, the effect of the force 190 from the finger 180 on the pressure-sensitive element 134 is smaller than the effect on the pressure-sensitive element 132 so that also the force in z-direction can be resolved in x, y-direction, i.e. a position can be located at which the force is applied.

Therefore, if pairs made of a pressure-sensitive element and an electrode element are individually read out, i.e. a change in capacitance and change in resistivity is monitored, the touch sensing device 100 allows for sensing multi-touch. That is, not only multi-touch in the x, y-plane can be sensed but also, in addition to the x, y-positions touched, the pressure exerted on this/these position(s) may also be determined. Accordingly, different x, y-positions and their corresponding z-direction pressure can be obtained basically in parallel allowing real three-dimensional multi-touch.

As indicated in FIG. 1, the voltage U triggers a touch event, i.e. when the amount of charge needed to charge the capacitor formed by electrode element 122 and finger 180 to a predefined voltage U is above a given threshold, an event is triggered. Further, a voltage drop across the pressure-sensitive element 132 can be determined by comparing the voltage of the upper conductor 142 with the voltage of the lower conductor 143 wherein $\Delta U$ then corresponds to the pressure applied.

It is understood that the above-described advantages can also be achieved with the above-mentioned touch sensors having a capacitive ITO pattern where each sensor element consists of two electrodes.

In the following, a detailed embodiment of the touch sensing device 200 will be explained with respect to FIG. 2.

Figure 2:
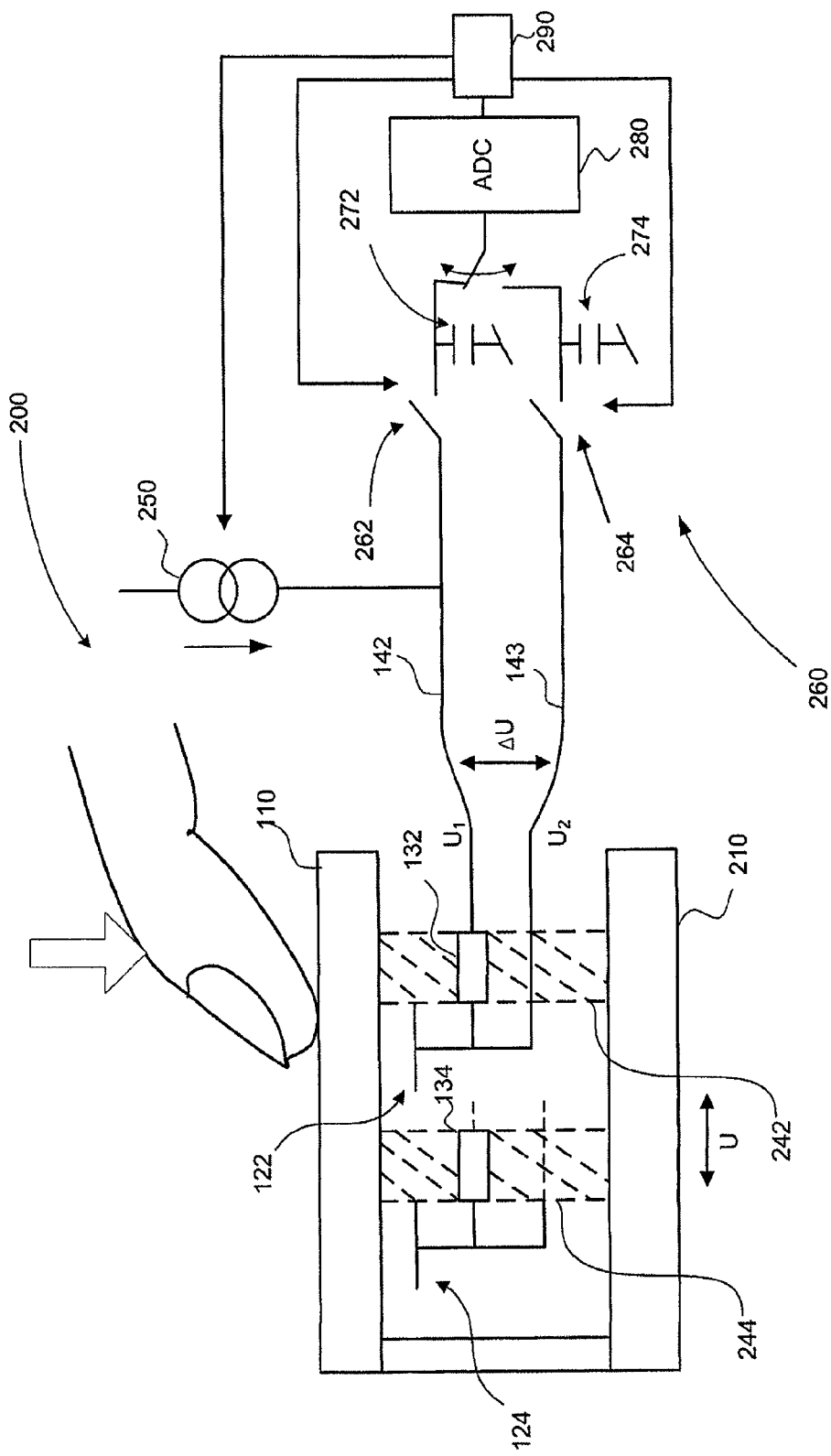
FIG. 2 illustrates another touch sensing device and elements thereof according to a detailed embodiment of the invention.

In FIG. 2, the touch sensing device 200 is basically the same as the touch sensing device 100 of FIG. 1. In particular, in FIG. 2 also a determination section 260, a power supply 250 and a controller 290 of the touch sensing device 200 are shown.

In detail, the touch sensing device 200 comprises the cover layer 110, the first electrode element 122, the second electrode element 124, the first pressure-sensitive element 132, the second pressure-sensitive element 134, a bottom plate 210, as well as first and a second pressure concentration structure 242 and 244, respectively. As indicated above, the touch sensing device 200 further comprises the power supply 250, the determination section 260 and the controller 290, wherein the determination section 260 comprises a first and a second sample and hold circuit 262 and 264, respectively, a first and a second capacitor 272 and 274, respectively, and an analogue-to-digital converter 280.

The electrode elements and pressure-sensitive elements their connections and arrangement is basically the same as described above in FIG. 1. In FIG. 2, spatial and mechanical separation of the first and second pressure-sensitive elements 132 and 134, respectively is emphasized by placing the first and second pressure-sensitive elements in a first and a second pressure concentration structure 242, 244, respectively. The pressure concentration structures are relatively hard structures and are hatched with dashes.

The pressure concentration structures are preferably made of a transparent material harder than the surrounding material, e.g. an ITO film, so that the force applied by the finger 180 in the example of FIG. 1 is channelled to the pressure-sensitive element 132. For example, the pressure concentration structure can be formed in a columnar shape below the cover layer 110 comprising the pressure-sensitive element and being perpendicular to the cover layer 110 so that several pressure concentration structures can be provided between the cover layer 110 and the bottom plate 210, which are spatially separated from each other so as to indicate a force in the z-direction and also the section of the cover layer 110, on which the force is applied, i.e. a x, y-position with a resolution of roughly the spacing between the pressure concentration structures.

The pressure-sensitive elements together with the pressure concentration structures are integrated in the electrode element layer which may be formed of an ITO film in the embodiment of FIG. 2. The pressure-sensitive elements 132 and 134 may be formed of a quantum tunnelling composite (QTC) or a polymer that may be applied as ink in a manufacturing process when forming the ITO film.

Accordingly, the touch sensing device 200, and also the touch sensing device 100, can be realized by placing a pressure-sensitive element in the sensing path to each electrode element, wherein the pressure-sensitive element and the electrode element are sandwiched between the bottom plate, e.g. made of transparent plastics or glass and the deformable cover layer on top.

As a result, as described above, when pressure is applied, the cover layer bends activating electrode elements and pressure-sensitive elements in relation to the distance to the point where the pressure is applied. Then, the applied pressure and position can be estimated by processing data, such as voltage signals, from the elements as will be described in detail below.

As described above, a pressure-sensitive element may comprise QTC but is not limited thereto and may also be based on doped polymers or any similar technology.

An example of one-way for obtaining signals from a pressure-sensitive element and an electrode element indicating the x, y-position of a touch and the force applied by a touch in z-direction, is presented using the exemplary determination section 260 of FIG. 2.

The determination section determines a change in resistivity of the pressure-sensitive element, such as a pressure-sensitive resistor made of QTC available from Peratech Ltd., UK. The change in resistivity is in response to a pressure exerted upon the cover layer 110.

It is understood that several different kinds of determination sections can be used to obtain the corresponding signals from electrode elements and pressure-sensitive elements. For example, a simple voltage meter could be connected to the pressure-sensitive element 132 on both sides of the pressure-sensitive element so as to measure a voltage across the pressure-sensitive element, and in particular a voltage drop or rise associated with the change in pressure due to a force exerted by a finger or similar.

In the example described with respect to FIG. 2, the determination section is connected to two conductors 142 and 143, wherein the conductor 143 is directly coupled to the electrode element 122 and the conductor 142 is indirectly coupled to the electrode 122, namely via the pressure-sensitive element 132. Further, the power supply 250 is connected to the conductor 142 and thus coupled to the pressure-sensitive element 132 and is able to supply a current, preferably a constant current or other known waveform, to the associated electrode element 122.

On the other side of the conductor 142, it is connected to the first sample and hold circuit 262 which can be controlled by the controller 290. The first sample and hold circuit is associated with a capacitor 272 to store a charge flowing over the closed first sample and hold circuit 262, wherein this charge corresponding to a voltage U1 can be subsequently read out and converted to a digital signal by the analogue-to-digital converter (ADC) 280.

Similarly the conductor 143 is connected to the second sample and hold circuit 264 that may also be controlled by the controller 290 and that is associated with the capacitor 274. The capacitor 274 may be charged when the second sample and hold circuit 264 is closed and a charge corresponding to a voltage U2 may be converted into a digital signal by the ADC 280.

In FIG. 2 only one ADC is provided for two capacitors 272 and 274 so that for a read out, it has to be switched between the capacitors as indicated in FIG. 2. However, also two ADCs or one ADC unit with two inputs could be used.

Furthermore, it is understood that a similar circuitry as determination section can be provided for the second electrode element 124 and second pressure-sensitive element 134 to read out signals from these elements.

It is noted that in the example of FIG. 2 only two pressure-sensitive elements and two electrode elements are shown for illustrative purposes and when more than two pressure-sensitive elements and electrode elements should be used, a similar amount of determination sections could be used. Furthermore, several possibilities are known in the art to reuse one circuitry for more than one pair of an electrode element and pressure-sensitive element, such as switches switching between different pairs. In general, a single ADC and power supply can supply scanning of a complete touch matrix with more than 100 pressure-sensitive elements.

The controller 290 may be a part of the determination section 260 or may be a separate element to control one or more determination sections as well as the power supply 250 as indicated by the arrow. In detail, the controller 290 may control the sample and hold circuits and read out the associated capacitors, as described above and indicated by the arrows, and may then analyze the received signals.

In particular, the controller 290 may calculate $\Delta U$ from the voltages U1 and U2 to obtain information about the voltage change at the pressure-sensitive element 132. This information can then be used to trigger a function of a device using the touch sensing device 200, such as a mobile phone in which the touch sensing device is incorporated.

In case of usage with a mobile device, saving energy is a major concern so that the controller 290 may only perform an analysis and calculation when there is actually a finger or stylus present on the cover layer 110, which can be determined by the voltage U2.

Accordingly, the controller 290 may control supply of current to the electrode elements of the touch sensing device 200. For example, if it is determined that the touch sensing device is currently not in use, current may be supplied only to every second electrode element of the touch sensing device in relatively large time periods and once a touch is detected, the time periods may be shortened and current may be supplied to each electrode element of the touch sensing device.

Figure 4:
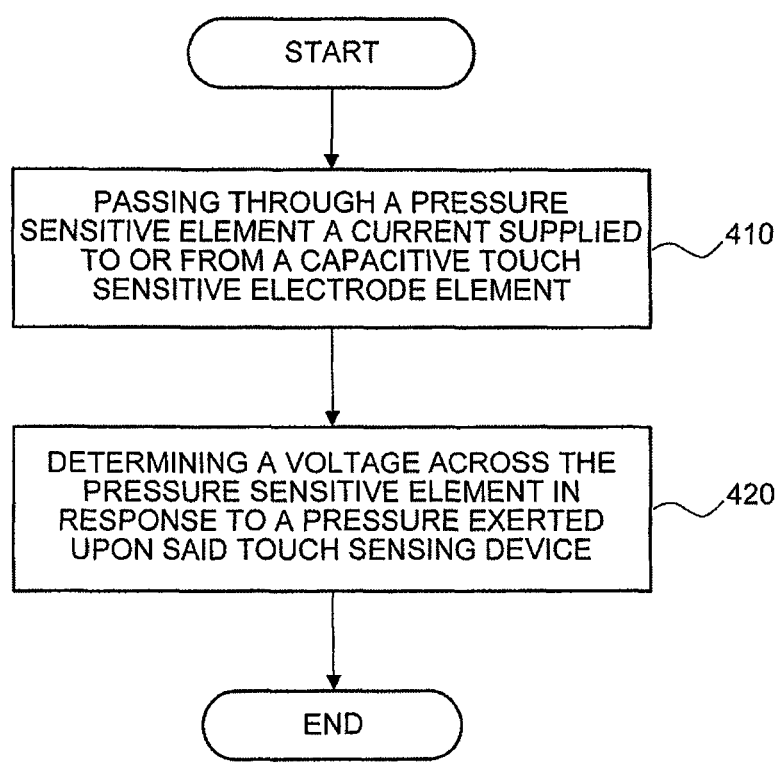
FIG. 4 illustrates a flow diagram of a method for sensing a touch on a touch sensing device according to an embodiment of the invention.

In the following, operations of the touch sensing device 200 will be described. The basic operations are described in FIG. 4, wherein in step 410 a current supplied to or from a capacitive touch-sensitive electrode element, such as electrode element 122, is passed through a pressure-sensitive element, such as pressure-sensitive element 132.

Then, in step 420, the voltage across the pressure-sensitive element is determined, wherein a voltage change in the pressure-sensitive element can be detected in response to a pressure exerted upon the touch sensing device.

In more detail, the power supply 250 may provide a constant current so as to charge up the electrode element 122 in FIG. 2. $\Delta U$ in FIG. 2 is the voltage drop caused by the pressure-sensitive element 132 and the charge current of the power supply 250 and may be determined in different ways.

Basically the voltages U1 and U2 should be sampled roughly simultaneously, preferably at the end of a charge cycle. In this case, both the pressure change and a touch can be determined by a single analogue-to-digital conversion. If the voltage change (U1-U2) is sampled before full charge of the electrode element, a second sampling of U2 should be made, i.e. U2 should be sampled at first simultaneously with the sampling of U1 and then the second sampling at the end of the charge cycle of U2 alone. For efficient sampling a high impedance buffer can be applied in front of the capacitors 272 and 274 not to load the power supply. A high impedance buffer in front of a sample and hold circuit might be useful not to load U1 and U2.

As is understood, current need to be fed through the pressure-sensitive element when the voltages are sampled, since otherwise no voltage change can be detected over the pressure-sensitive element. However, as long as the amount of charge from the power supply is known/controlled when sampling, it does not really matter if some charge is fed to the electrode element after sampling.

In a simple procedure, the electrode element 122 of the touch sensing device 200 is charged up with a constant current while the sample and hold circuits are open. Subsequently, the supply of current from the power supply is stopped and both switches of the sample and hold circuits 262 and 264 are closed so that the charge accumulated on the electrode element 122 charges the capacitors 272 and 274, wherein the difference in charge between the capacitors 272 and 274 is dependent on the resistivity of the pressure-sensitive element in the upper conductor path 142 and thus proportional to $\Delta U$.

In the following, a different procedure for determining $\Delta U$ is described, which is a more preferable. Here again the electrode element 122 is charged with a current from the power supply 250 and at the end of the charge cycle, U1, i.e. charge flowing on the capacitor 272, is sampled. Subsequently, the power supply 250, which is basically a charge pump, is immediately shut off and the capacitor 274 is sampled to obtain the voltage U2.

These charging and sampling procedures can be performed for several pairs consisting of an electrode element and a pressure-sensitive element so that the touch sensing device 200 is able to provide multi-touch functionality not only for obtaining different positions in x, y-space but also obtaining different pressures from the different simultaneously touched positions.

Returning to FIG. 3, a display assembly 350 is provided below a touch sensing device, such as the touch sensing device 100 of FIG. 1 or 200 of FIG. 2, thereby providing a touch screen device 300.

The display assembly 350 may comprise any kind of display, such as an LCD (Liquid Crystal Display) or OLED- (Organic Light-Emitting Diode) display. Here, the cover layer 110 and the bottom plate 210 are at least partly made of a transparent material, i.e. a light-transmissive material, allowing to view or read the display of the display assembly underneath. Similar to the discussion with respect to FIG. 1 and FIG. 2, the cover layer 110, which may comprise a glass or plastic window, can be made of a flexible and preferably resilient material but is not limited thereto. Further, the bottom plate 210 may also comprise a glass or plastic window but does not need to be deformable, and is usually stiff.

As described above, the display assembly 350 may be a LCD providing visual information. Therefore, it is understood that the touch sensing device placed on top of the display assembly 350 should not degrade the display visibility thus requiring the touch sensing device to meet certain criteria.

At first, the electrode elements should be made of a transparent material, such as ITO, wherein usually a capacitive ITO pattern, such as a diamond pattern is used, which is transparent.

Further, as pressure-sensitive element, a transparent QTC element may be chosen, wherein the amount of elements can be chosen in a way so that the resolution and functional requirements are fulfilled with a minimal number of elements. For example, the resolution/grid of a capacitive touch display can be chosen to be 5 mm×5 mm so that only one pressure-sensitive element is needed for a patch of 5 mm×5 mm size which should not affect the visibility significantly. Further, if the capacitive matrix is designed by electrode elements with the size of about 5 mm×5 mm corresponding to the size of a fingertip, higher resolution can be achieved by using voltage readings from not only the closest capacitive element to the finger but also every other. By doing this a two dimensional voltage profile can be determined and resolution as fine as 1 display pixel can be achieved.

5 mm×5 mm can thus be chosen as the density of ITO diamond shapes used as electrode elements. The actual size of the pressure-sensitive element may then be decided by the properties of the material used, such as QTC, as well as the programmable controller, such as the CapTouch programmable controller, used for controlling the charge and read out of the electrode elements, and its delta-sigma AD converter properties. The size of the pressure-sensitive element is particularly of concern when a non-transparent material is used, since this will affect the LCD visibility.

Figure 3:
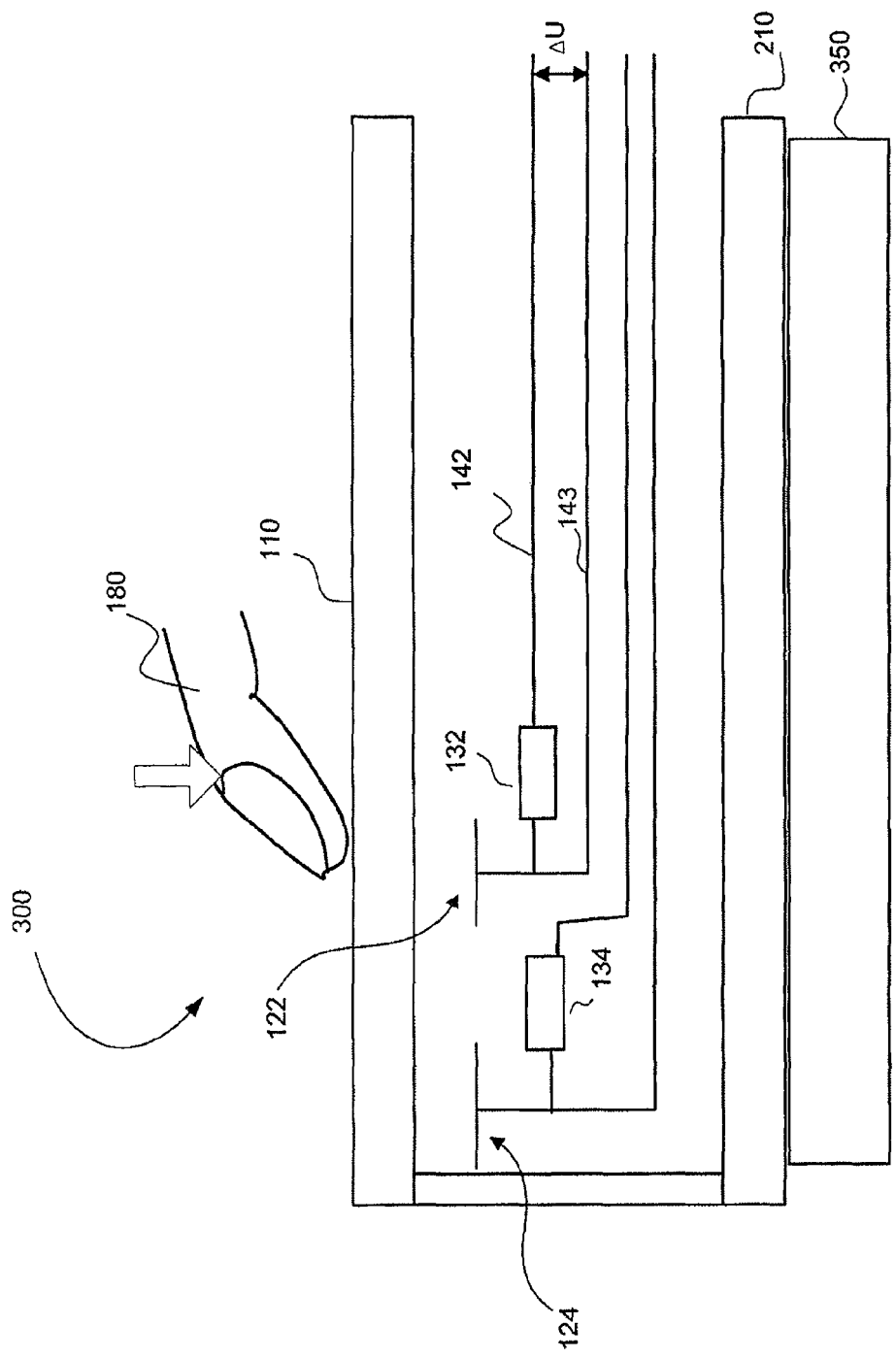
FIG. 3 illustrates another touch sensing device and elements thereof according to another embodiment of the invention.

As described above, it is clear that only two electrode elements have been used in FIGS. 1, 2 and 3 for illustrative purposes and more than two electrodes elements can be used to obtain a higher resolution.

However, if, for example, a thousand electrode elements are used, it might not be necessary to couple each electrode element to a pressure-sensitive element, since it is feasible to provide a different resolution in the x, y-direction than the actual corresponding z-direction, so that it may not be necessary to obtain a direct z-direction reading for each x, y-position reading. For example, a z-direction reading may also be obtained at a position by interpolating two z-direction readings of neighbouring pressure-sensitive elements.

Figure 5:
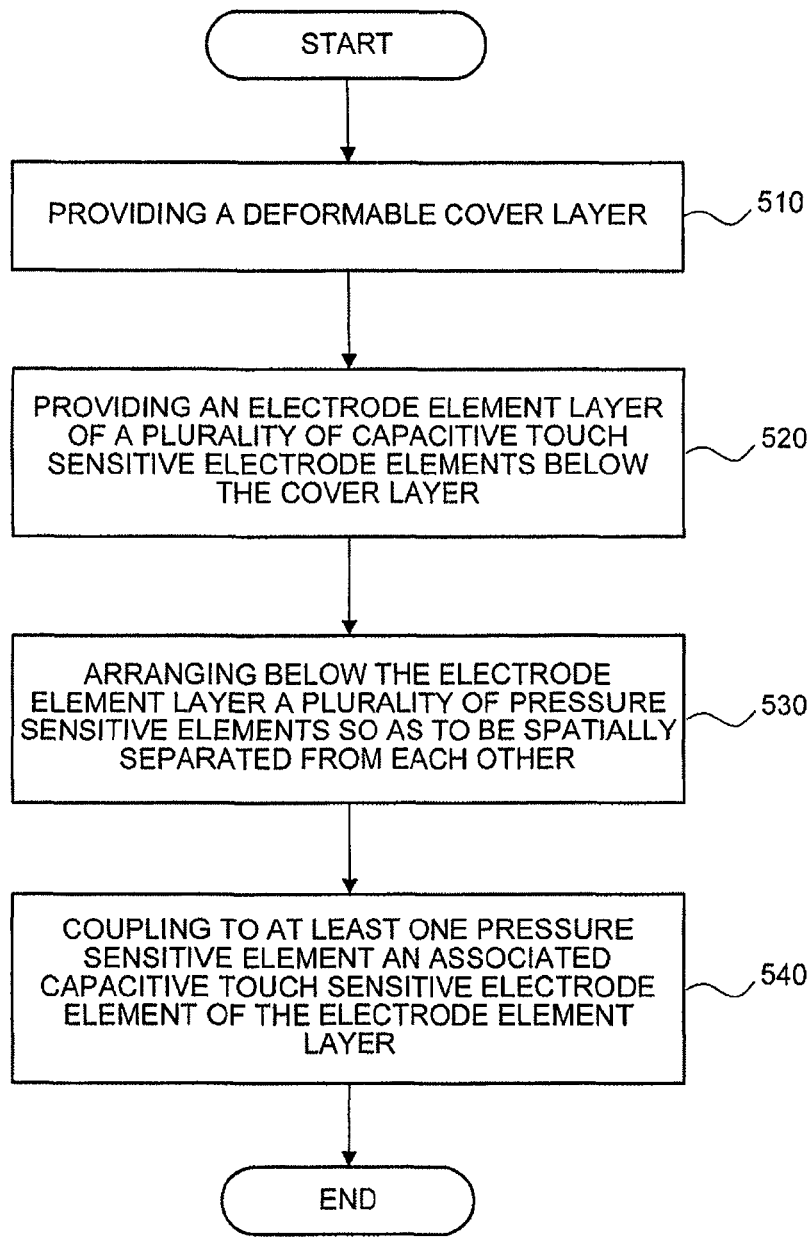
FIG. 5 illustrates a flow diagram of a method for manufacturing a touch sensing device according to an embodiment of the invention.

In the following, steps of a method for manufacturing a touch sensing device, such as a touch sensing device 100 or 200, will be described with respect to FIG. 5. In a first step 510, a deformable cover layer is provided. In the next step 520, an electrode element layer of a plurality of individual capacitive touch-sensitive electrode elements is provided below the cover layer. Below the electrode element layer, a plurality of pressure-sensitive elements are arranged in step 530 so as to be spatially separated from each other.

As described above, the cover layer is a top layer that is flexible enough to activate the underlying pressure sensors, i.e. pressure-sensitive elements. Depending on the flexibility of the cover layer more than one of the pressure sensors will be activated simultaneously. The harder, i.e. the less flexible, the cover layer, the more pressure sensors will be activated. However, since the cover layer is at least somewhat flexible and the sensor readings decrease with the distance to the position where the force is applied, the exact position can be estimated by processing the data from several pressure-sensitive elements so that a resolution higher than the spacing between pressure-sensitive elements can be obtained.

This gives the opportunity to detect handwriting as this requires usually a higher resolution than provided by the spatial separation of the pressure sensors (pressure-sensitive elements), wherein one pressure sensor is usually placed in a 5 mm×5 mm section.

It is noted that the pressures sensors in practice do not really need to be compressed to be activated, since a slight touch on the cover layer may be sufficient to provide a pressure wave to a highly sensitive pressure sensor, carried through the pressure concentration structure, for example. As a result, the cover layer can be quite hard but flexible enough to show enough force distribution characteristics to fulfil the requirements to estimate pressure and position.

As mentioned above, the electrode elements are preferably made of ITO, e.g. the electrode element layer may be an ITO film. In detail, the electrode elements can be manufactured on/in an ITO film that is placed on the cover layer. When manufacturing the ITO film other material incorporating QTC or a doped polymer to form the pressure sensors and pressure concentration structures can be added in the film-manufacturing process. The pressure sensors are preferably smaller than a pixel size of a display assembly which can be mounted underneath.

When arranging the pressure-sensitive elements, i.e. the pressure sensors, below the electrode element layer, a pressure-sensitive element is electrically coupled to an associated capacitive touch-sensitive electrode element of the electrode element layer, which is indicated in step 540. Thereby, electrical connections are formed. In detail, a pressure-sensitive element and the associated electrode element are arranged in proximity of each other and coupled so that when a current to or from the electrode element passes through the pressure-sensitive element, a voltage across the pressure-sensitive element responds to a pressure exerted upon the cover layer above the electrode element and thus changes.

In another embodiment, the touch sensing device 100 or 200 or the touch screen device 300 is incorporated in a mobile device, such as a cellular phone or other type of mobile phone, or portable computer. The applications of the touch sensing device or a touch screen device are clearly not limited to mobile phones but incorporation in mobile devices is particular advantageous, since these devices are usually small and require intelligent user interface or man-machine interfaces to trigger various functions. Therefore, incorporating the touch sensing device or touch screen device, which can be relatively small, in a mobile device is highly advantageous.

The description above has mentioned several individual entities, such as the controller 290 and determination section 260, and it should be understood that the invention is not limited to these entities as structural individual units but these entities should be understood as entities comprising different functions.

As described above, the controller 290 can be incorporated in the determination section 260, wherein the controller may be any kind of processor or microprocessor or CPU running software that may be stored on a separate but connected memory to control the touch sensing device.

Furthermore, the sample and hold circuits are just examples of how to realize a way of reading out the pressure-sensitive elements and electrode elements and the invention is not limited thereto.

Moreover, the controller or the determination section or a memory connected thereto may comprise or store computer programs including instructions such that, when the computer programs are executed, operations to control the functions of the determination section or controller are carried out, such as controlling the power supply and the sample and hold circuits, reading out and analyzing the signals from the electrode elements and pressure-sensitive elements as well as calculating a voltage drop.

Therefore, it should be understood that particularly the determination section and the controller may be implemented in hardware, software, field-programmable gate arrays (FPGAs), application-specific integrated circuits (ASICs), firmware or the like. Furthermore, the controller may incorporate the functions of a controller such as the CapTouch programmable controller described above.

It will be apparent that various modifications and variations can be made in the described elements, touch sensing devices, touch screen devices, mobile devices and methods as well as in the construction of this invention without departing from the scope or spirit of the invention. The invention has been described in relation to particular embodiments which are intended in all aspects to be illustrative rather than restrictive. Those skilled in the art will appreciate that many different combinations of hardware, software and firmware are suitable for practicing the invention.

Moreover, other implementations of the invention will be apparent to the skilled person from consideration of the specification and practice of the invention disclosed herein. It is intended that the specification and the examples are considered as exemplary only. To this end, it is to be understood that inventive aspects may lie in less than all features of a single foregoing disclosed implementation or configuration. Thus, the true scope and spirit of the invention is indicated by the following claims.

The invention claimed is:

1. A touch sensing device, comprising
a deformable cover layer;
a plurality of capacitive touch sensitive electrode elements arranged in an electrode element layer below said cover layer; and
a plurality of pressure sensitive elements each being spatially separated from each other and being coupled to an associated capacitive touch sensitive electrode element of said electrode element layer,
wherein one of said plurality of pressure sensitive elements and the associated capacitive touch sensitive electrode element are respectively arranged so that when a current to or from said capacitive touch sensitive electrode element is passed through said pressure sensitive element, the voltage across said pressure sensitive element changes in response to a pressure exerted upon said cover layer above said capacitive touch sensitive electrode element; and
wherein the touch sensing device is configured to individually read out pairs made of respective pressure elements and the associated capacitive touch sensitive electrode element to perform three-dimensional multi-touch sensing to respectively determine a pressure exerted onto the deformable cover layer at each one of multiple locations on the deformable cover layer that are touched simultaneously.

2. The touch sensing device of claim 1, wherein each pressure sensitive element is comprised in a pressure concentration structure spatially separated from another pressure concentration structure.

3. The touch sensing device of claim 2, wherein a pressure concentration structure is formed in a columnar shape below said cover layer.

4. The touch sensing device of claim 1, wherein said pressure sensitive element comprises QTC or doped polymer.

5. The touch sensing device of claim 1, further comprising a determination section to determine a change in resistivity of said pressure sensitive element in response to the pressure exerted upon said cover layer.

6. The touch sensing device of claim 5, wherein said determination section is adapted to determine the voltage across the pressure sensitive element.

7. The touch sensing device of claim 5, wherein said determination section comprises a first and a second sample and hold circuit.

8. The touch sensing device of claim 1, further comprising a power supply coupled to at least one of the pressure sensitive elements to supply a current to the associated capacitive touch sensitive electrode element.

9. The touch sensing device of claim 1, further comprising a controller to control supply of said current to said capacitive touch sensitive electrode element.

10. Touch screen device comprising said touch sensing device of claim 1 and a display assembly below said touch sensing device.

11. Mobile device comprising said touch screen device of claim 10.

12. Mobile device comprising said touch sensing device of claim 1.

13. The touch sensing device of claim 1, wherein said pressure sensitive element is placed in a sensing path which connects the associated capacitive touch sensitive electrode element to a determination section or to a power supply.

* * * * *